(12) United States Patent
Gerber et al.

(10) Patent No.: US 7,637,282 B2
(45) Date of Patent: Dec. 29, 2009

(54) COMPRESSOR THROTTLING VALVE ASSEMBLY

(75) Inventors: Thomas E. Gerber, Williamsville, NY (US); Mark R. Sabin, Sanborn, NY (US)

(73) Assignee: Cameron International Corporation, Houston, TX (US)

( * ) Notice: Subject to any disclaimer, the term of this patent is extended or adjusted under 35 U.S.C. 154(b) by 0 days.

(21) Appl. No.: 12/534,822

(22) Filed: Aug. 3, 2009

(65) Prior Publication Data

US 2009/0294717 A1 Dec. 3, 2009

Related U.S. Application Data

(63) Continuation of application No. 11/200,613, filed on Aug. 10, 2005, now Pat. No. 7,568,503.

(51) Int. Cl.
*F16K 39/00* (2006.01)

(52) U.S. Cl. .................. 137/637.2; 137/240; 137/637.4

(58) Field of Classification Search .................. 137/240, 137/637.2, 637.4, 637, 637.3, 637.5
See application file for complete search history.

(56) References Cited

U.S. PATENT DOCUMENTS

| | | | |
|---|---|---|---|
| 4,545,742 A | 10/1985 | Schaefer | |
| 4,662,190 A | 5/1987 | Tischer | |
| 6,244,289 B1 * | 6/2001 | Hopfe et al. | 137/197 |
| 6,397,892 B1 * | 6/2002 | Pyle et al. | 137/637.2 |
| 6,453,658 B1 | 9/2002 | Willis et al. | |

* cited by examiner

*Primary Examiner*—Kevin L Lee
(74) *Attorney, Agent, or Firm*—Fletcher Yoder

(57) ABSTRACT

A throttling valve assembly has an outer housing that is sealed. An actuator is connected to a pressure balanced shaft that extends into the housing to operate a plurality of linkages that can rotate blades in tandem. With the surrounding housing sealed, the shaft penetrations of the blade support shafts no longer need seals or a purge system to supply process gas during times of reduced pressure in situations with the blades nearly closed. A pressure equalization system has balance passages internal to the housing to allow flow from higher pressure zones to lower pressure zone of the process gas so as to avoid creation of a condition that can draw air into any zones of reduced pressure in the housing.

20 Claims, 4 Drawing Sheets

COMPRESSOR THROTTLING VALVE ASSEMBLY

CROSS REFERENCE TO RELATED APPLICATION

This application is a continuation of U.S. patent application Ser. No. 11/200,613, entitled "Compressor Throttling Valve Assembly", filed Aug. 10, 2005, now U.S. Pat. No. 7,568,503, which is herein incorporated by reference in its entirety.

FIELD OF THE INVENTION

The field of this invention is throttling valves and more particularly those used on centrifugal compressors to match output to system demands.

BACKGROUND OF THE INVENTION

Centrifugal compressors are frequently packaged in multiple stages using a common drive including associated controls. One type of control involved throttling the suction to the initial stage so as to match the output of the compressor to the system demands. Doing this avoids the cost of energy to power the compressor units at output levels not required from the system. The nature of the performance curve of centrifugal compressors is that their output flow and pressure are related and can be varied by a throttling assembly typically mounted at the suction to the first stage. These throttling assemblies have been designed in the past using a series of blades that rotate 90 degrees between the open and closed position. Typically each blade has a pair of end shafts that extend out of the inlet piping going to the first stage. Each such shaft extension through the piping system was provided with a shaft seal and a purge system. The purpose of the purge system was to keep gasses from escaping these shaft seals particularly in applications where inlet pressures in a particular system ran normally at elevated pressures that were raised to an even higher pressure by the compressor system. The purge system served a purpose of avoiding sucking in surrounding air in some systems. In conditions of high turndown when the blades are operating close to the fully closed position, it was possible for the compressor to draw the pressure down to negative values. In those cases, in order to avoid drawing air into the process gas being compressed, the process gas was hooked to the purge system. If a negative pressure situation occurred, the process gas would be sucked in around shaft seals located at each end of each blade. Depending on the inlet piping size, there could be several blades rotating in tandem with each one having a connection to the purge system.

The blades each had a dedicated linkage typically connected to a rotating ring that was turned by an actuator, typically operated by pneumatic pressure.

The problems with the prior design were numerous. As mentioned above there was the concern of leakage at every shaft seal of every blade and the need to hook up a purge system to each potentially leaking seal. The present invention eliminates the concerns of the previous designs by enclosing the inlet pipe with the blades inside in a surrounding housing. In this approach the leakage at blade shaft seals becomes irrelevant as a surrounding housing contains the process gas. The design further extends a balanced driving piston that is powered by the external pneumatic actuator into the interior of the housing. Balancing the piston reduces actuator output requirements be eliminating internal housing pressure as a load on the drive stem. Multiple seals are available on the drive stem penetrations of the housing to further enhance reliable operation. One or more internal passages remain open between the upstream and downstream sections of the housing on either side of the blades. Thus, when high turndowns with nearly closed blades bring the downstream pressure down to negative values due to continuing compressor operation, the passages serve an equalization function to avoid sucking air into the housing. These and other features of the present invention will be more readily understood from a review of the description and drawings of the preferred embodiment and the claims, which appear below.

SUMMARY OF THE INVENTION

A throttling valve assembly has an outer housing that is sealed. An actuator is connected to a pressure balanced shaft that extends into the housing to operate a plurality of linkages that can rotate blades in tandem. With the surrounding housing sealed, the shaft penetrations of the blade support shafts no longer need seals or a purge system to supply process gas during times of reduced pressure in situations with the blades nearly closed. A pressure equalization system has balance passages internal to the housing to allow flow from higher pressure zones to lower pressure zone of the process gas so as to avoid creation of a condition that can draw air into any zones of reduced pressure in the housing.

DETAILED DESCRIPTION OF THE PREFERRED EMBODIMENT

Figure 1:
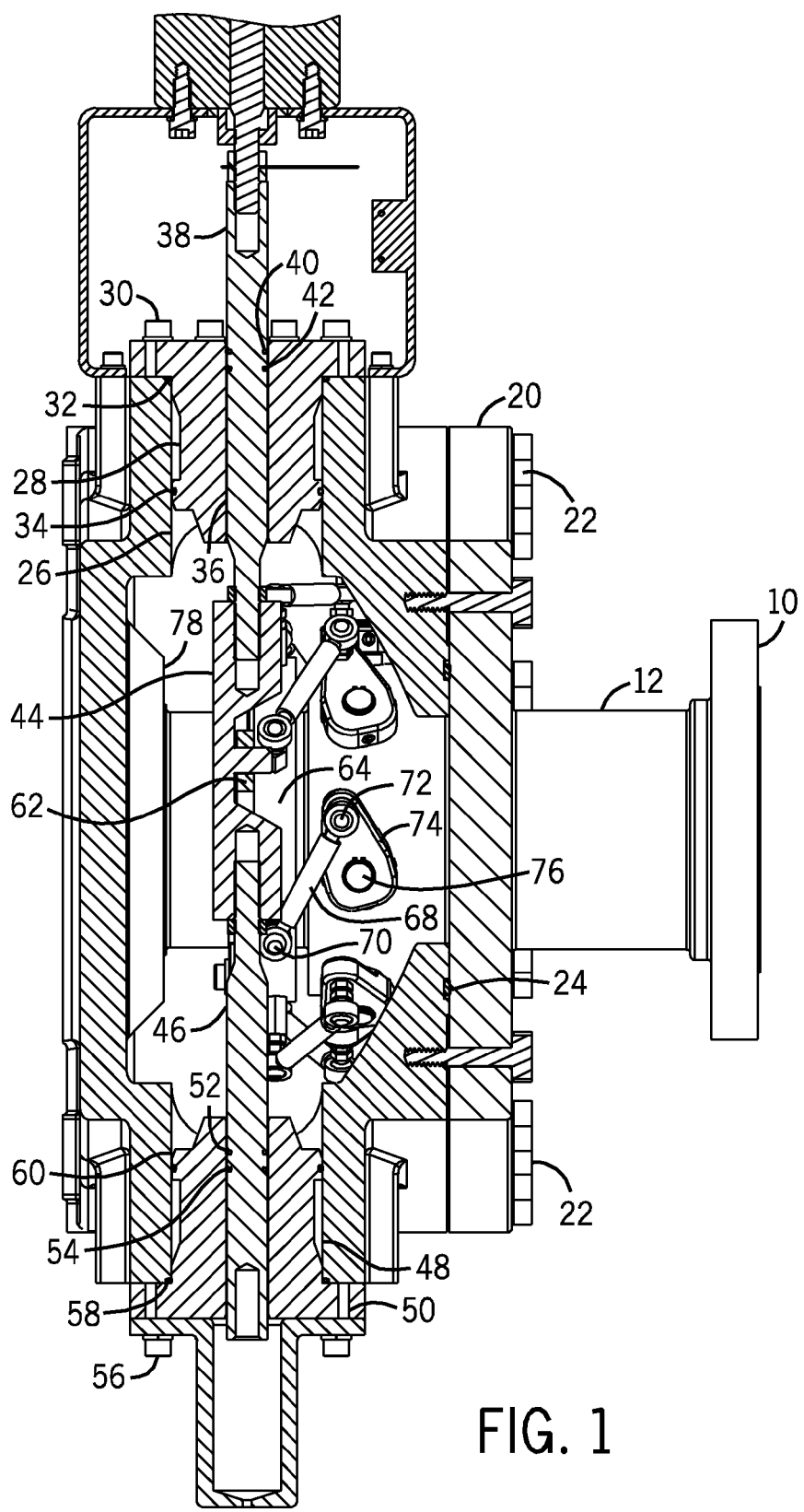
FIG. 1 is a section view through the outer housing showing the shaft and linkage system that it operates.
Figure 4:
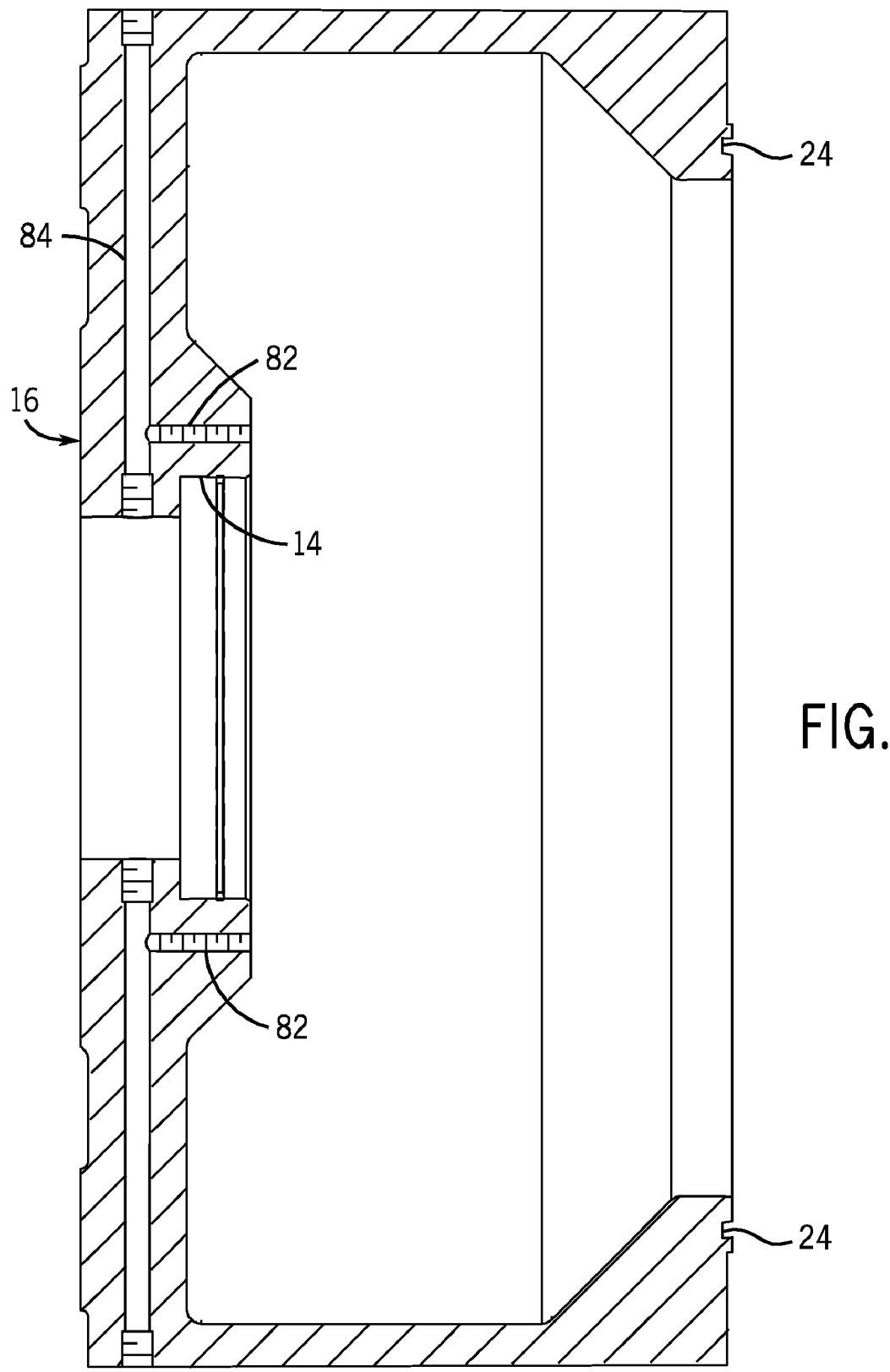
FIG. 4 is a section view through the outer housing.

Referring to FIG. 1 a compressor system (not shown) has its inlet attached at flange 10. Flange 10 is connected to inner housing 12 which is essentially a section of pipe that extends into a recess 14 (see FIGS. 2 and 4) of outer housing 16 and is sealed to said recess 14 with a seal 18. Attached to inner housing 12 is a flange 20 which is secured to outer housing 16 by bolts 22. A seal 24 seals the flange 20 to the outer housing 16. Outer housing 16 has an upper opening 26 which is closed off by a plug 28 secured in a sealing relationship due to bolts 30 and seals 32 and 34. A bore 36 accepts upper rod 38 which can translate in the bore 36 while being sealed to it by redundant seals 40 and 42. A connector 44 attaches lower rod 46 to upper rod 38. Opening 48 is opposed to opening 26 and accepts a plug 50 through which the lower rod 46 translates while in a sealed relationship due to redundant seals 52 and 54. Plug 50 is retained in a sealing relation to the outer housing 16 by use of bolts 56 and seals 58 and 60.

Figure 2:
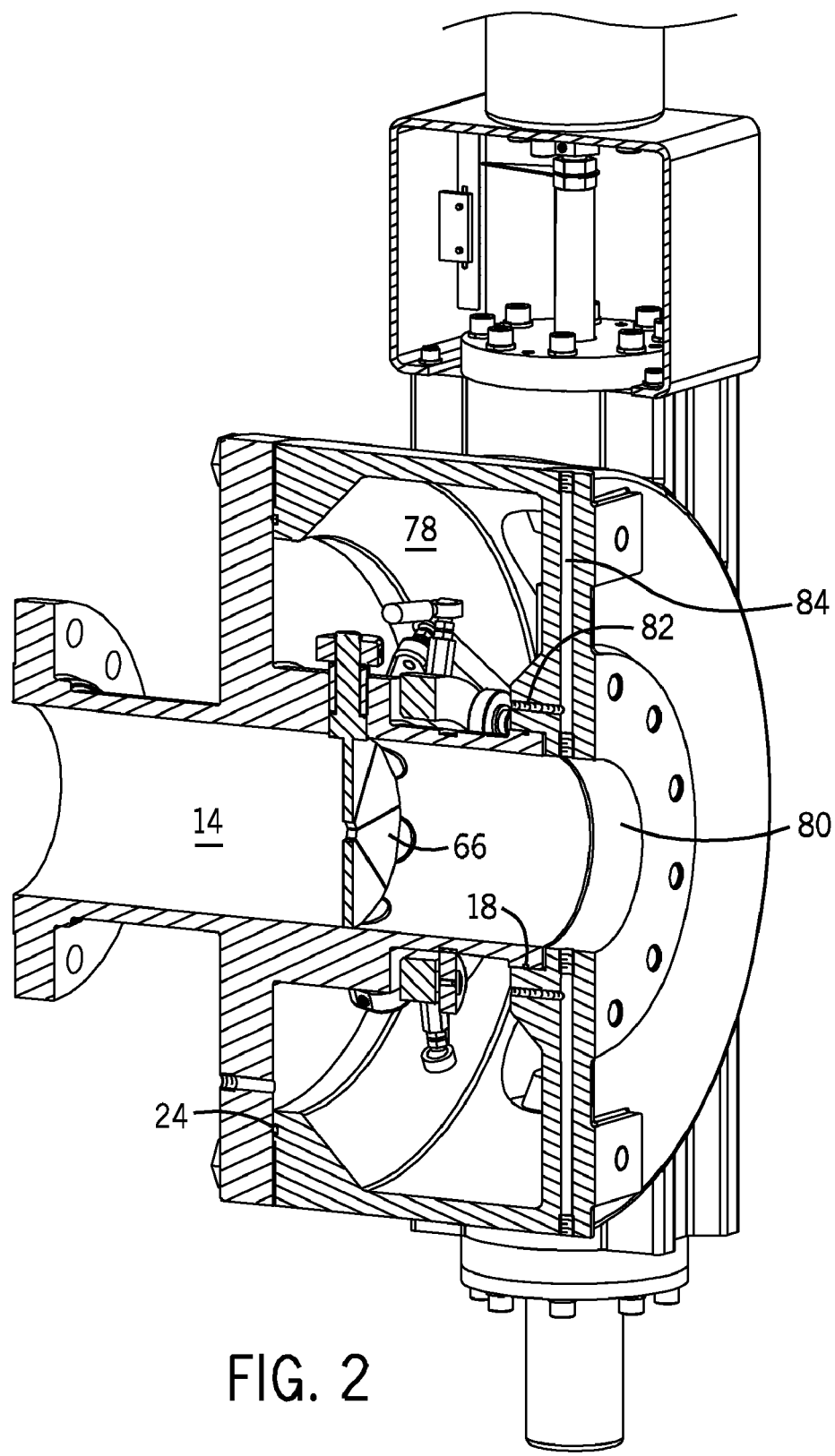
FIG. 2 is a section through both outer and inner housings showing the blades.
Figure 3:
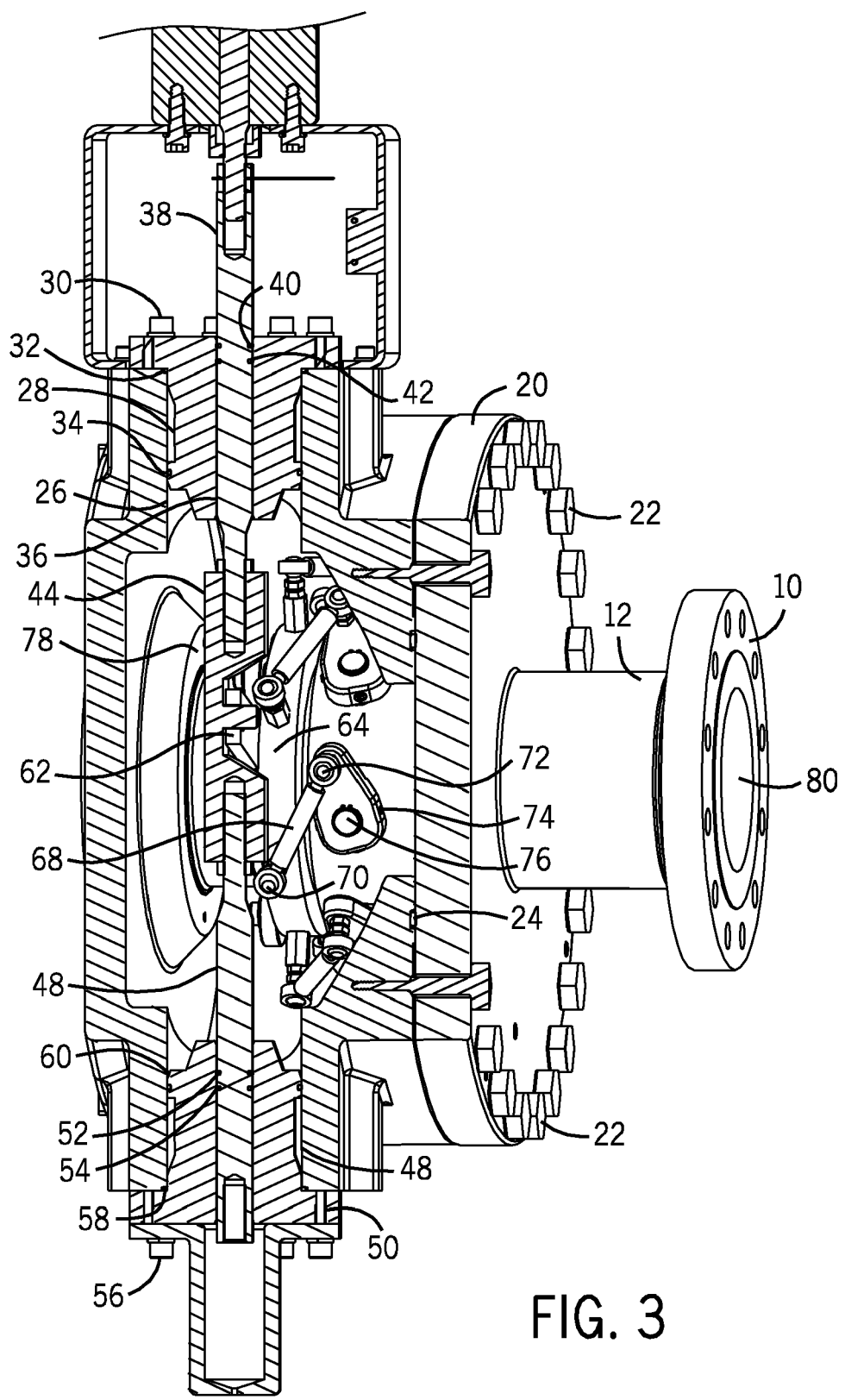
FIG. 3 is another section showing the manner the linkages are operated in tandem by the shaft.

Connector 44 is engaged to an arm 62 that extends radially from ring 64. Translation of connector 44 results in rotation of ring 64. Each blade 66 shown in FIG. 2 is connected to a linkage that comprises a link 68 pinned at 70 to ring 64 and pinned at 72 to link 74. Shaft 76 is rotated with link 74 and the blade 66 turns when shaft 76 turns. All shafts 76 are designed to rotate in tandem to operate each blade 66 in tandem and uniformly. FIG. 2 shows the blades 66 in the closed position.

The extensions of shafts 76 through inner housing 12 are no longer needed to be sealed as in the prior art. This is because there is an outer housing 16 that has its orifices sealed with flange 20, plug 28 and plug 50.

An annular space 78 is created between outer housing 16 and inner housing 12. Outer housing 16 has an upstream inlet 80 that leads to the blades 66 in the inner housing 12. Pressure in inlet 80 communicates through passage 82 into the annular space 78. That way when the blades 66 go toward the closed position reducing the pressure in the inner housing 12 near flange 10 gasses from annular space 78 flows around shafts 76 so that outside air is not drawn into the inner housing 12. Passage 84 is provided and can be blanked off on outer housing 16. Alternatively, a purge system that can deliver process gas into annular space 78 may still be wanted by some users and they can use passage 84 for that very purpose.

Those skilled in the art will appreciate that the pressure balanced design of upper rod 38 and lower rod 46 makes the driving assembly insensitive to annular space 78 pressure. The redundancy of seals such as 40 and 42 means more hours of reliable operation and less downtime. The pressure balanced design allows the use of a smaller actuator connected to upper rod 38. The pressure equalizing system has no moving parts and equalizes pressure differentials induced by reorientation of the blades 66 fairly fast. The design eliminates shaft seals on the rotating blade or blades 66. The two piece design of the outer housing 16 facilitates maintenance and assembly operations. Seals on rods 38 and 46 can be changed without taking the housing 16 out of the suction piping system to the compressor. Thrust loads on the shafts 76 are reduced if not eliminated since annular space 78 and inner housing 12 quickly equalize to a common pressure upstream of the blades 66.

While the preferred embodiment has been set forth above, those skilled in art will appreciate that the scope of the invention is significantly broader and as outlined in the claims which appear below.

The invention claimed is:

1. A system, comprising:
    a flow control device, comprising:
        an inner housing surrounding a fluid path;
        an outer housing surrounding the inner housing;
        a chamber between the inner housing and the outer housing
        a valve member disposed in the fluid path;
        a shaft extending through the inner housing to the valve member; and
        a first passage through the inner housing into the chamber, wherein the first passage is configured to enable pressure from the fluid path to pressurize the chamber.

2. The system of claim 1, wherein the first passage is upstream from the valve member.

3. The system of claim 1, wherein flow control device comprises a second passage from the chamber through the inner housing to the fluid path, and the second passage is downstream from the first passage.

4. The system of claim 3, wherein the first passage is upstream from the valve member, and the shaft extends through the second passage.

5. The system of claim 4, wherein the shaft is not sealed within second passage.

6. The system of claim 1, comprising a first drive rod extending through the outer housing at a first side, a second drive rod extending through the outer housing at a second side opposite from the first side, and a common linkage from the first and second drive rods to the shaft, wherein the common linkage is disposed in the chamber.

7. The system of claim 6, wherein the common linkage comprises a rotatable ring disposed about the inner housing, the first and second drive rods have a range of axial movement that causes a range of rotational movement of the rotatable ring, and the range of rotational movement causes actuation of the valve member.

8. The system of claim 7, comprising a plurality of valve members disposed in the fluid path, wherein each valve member comprises a shaft extending through the inner housing, and each shaft comprises an arm coupled to the rotatable ring.

9. The system of claim 6, comprising a drive disposed outside of the outer housing, a first seal disposed between the outer housing and the first drive rod, and a second seal disposed between the outer housing and the second drive rod, wherein the drive is coupled to the first drive rod, the second drive rod is driven by the first drive rod, and the first and second drive rods move in and out of the chamber along a common axis.

10. A system, comprising:
    a flow control device, comprising:
        an inner housing surrounding a fluid path;
        an outer housing surrounding the inner housing;
        a chamber between the inner housing and the outer housing
        a valve member disposed in the fluid path;
        a linkage coupled to the valve member, wherein the linkage is disposed in the chamber;
        a first drive rod extending through the outer housing into the chamber; and
        a second drive rod extending through the outer housing into the chamber, wherein the first and second drive rods are coupled to the linkage, the first and second drive rods move in synchronization with one another, the first drive rod moves into the chamber while the second drive rod moves out of the chamber, and the first drive rod moves out of the chamber while the second drive rod moves into the chamber.

11. The system of claim 10, wherein the first and second drive rods translate along a common axis.

12. The system of claim 10, wherein synchronized movement of the first and second rods displaces without changing volume of the chamber.

13. The system of claim 10, comprising a drive disposed outside of the outer housing, a first seal disposed between the outer housing and the first drive rod, and a second seal disposed between the outer housing and the second drive rod, wherein the drive is coupled to the first drive rod, and the second drive rod is driven by the first drive rod.

14. The system of claim 10, wherein the linkage comprises a rotatable ring disposed about the inner housing.

15. The system of claim 14, wherein the linkage comprises a first arm coupled to the rotatable ring, a second arm coupled to the first arm, and a shaft coupled to the second arm, wherein the shaft extends through the inner housing to the valve member.

16. The system of claim 10, wherein the linkage comprises a portion extending through the inner housing to the valve member, and the portion is not sealed with the inner housing.

17. The system of claim 10, comprising a first passage through the inner housing into the chamber, wherein the first passage is configured to enable pressure from the fluid path to pressurize the chamber.

18. A system, comprising:
    a flow control device, comprising:
        an inner housing surrounding a fluid path;
        an outer housing surrounding the inner housing;

a chamber between the inner housing and the outer housing a plurality of valve members disposed in the fluid path;

a plurality of valve linkages disposed in the chamber, wherein each valve member is coupled to at least one linkage; and a first drive member coupled to the plurality of linkages.

19. The system of claim 18, wherein the plurality of valve linkages comprise a rotatable ring disposed about the inner housing, and each valve member is coupled to a shaft extending through the inner housing, a first arm coupled to the shaft, and a second arm coupled to the first arm and the rotatable ring.

20. The system of claim 18, comprising a second drive member coupled to the plurality of linkages, wherein the first and second drive members extend through the outer housing into the chamber, and the first and second drive members move in synchronization with one another in opposite directions in and out of the chamber.

* * * * *